United States Patent
Yamawaki (10) Patent No.: US 7,355,773 B2
(45) Date of Patent: Apr. 8, 2008

(54) OPTICAL SCANNING APPARATUS AND IMAGE FORMING APPARATUS USING SAME

(75) Inventor: Takeshi Yamawaki, Suginami (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 11/367,137

(22) Filed: Mar. 3, 2006

(65) Prior Publication Data
US 2006/0203318 A1    Sep. 14, 2006

(30) Foreign Application Priority Data
Mar. 9, 2005    (JP) .............................. 2005-065375

(51) Int. Cl.
*G02B 26/08* (2006.01)
*B41J 27/00* (2006.01)

(52) U.S. Cl. ..................... 359/216; 359/217; 359/218; 347/261

(58) Field of Classification Search ..................... None
See application file for complete search history.

(56) References Cited

U.S. PATENT DOCUMENTS

| | | | |
|---|---|---|---|
| 5,278,691 A | 1/1994 | Kessler | |
| 6,104,523 A | 8/2000 | Ang | |
| 2004/0218029 A1 | 11/2004 | Shiraishi | |
| 2004/0263934 A1 | 12/2004 | Ando | |
| 2005/0062839 A1 | 3/2005 | Shiraishi | |
| 2005/0094233 A1* | 5/2005 | Tomioka | ..................... 359/204 |
| 2005/0280696 A1 | 12/2005 | Ishibe | |
| 2006/0054799 A1 | 3/2006 | Tomioka | |

FOREIGN PATENT DOCUMENTS

| | | |
|---|---|---|
| EP | 0575988 A | 12/1993 |
| EP | 1014148 A | 6/2000 |
| EP | 1602961 A | 12/2005 |
| EP | 1637916 A | 3/2006 |
| JP | 11-183837 A | 7/1999 |
| JP | 2002-267030 A | 9/2000 |

* cited by examiner

*Primary Examiner*—James Phan
(74) *Attorney, Agent, or Firm*—Canon U.S.A. Inc., I.P. Division (57) ABSTRACT

An optical scanning apparatus includes a light source device, a rotating polygon mirror, a first optical system, and a second optical system. The light source device has at least one light emitter. The first optical system can cause a light beam emitted from the light source device to be incident on the rotating polygon mirror. The width of the incident light beam is larger than the width of the deflecting surface of the rotating polygon mirror in the main scanning direction. The second optical system leads the light beam deflected by the rotating polygon mirror to a surface to be scanned. The surface to be scanned is scanned with the light beam in the main scanning direction by the rotation of the rotating polygon mirror. The number of the deflecting surfaces of the rotating polygon mirror is ten or less, and each conditional expression is satisfied.

16 Claims, 5 Drawing Sheets

OPTICAL SCANNING APPARATUS AND IMAGE FORMING APPARATUS USING SAME

BACKGROUND OF THE INVENTION

1. Field of the Invention

The present invention relates to an over-filled scanner (OFS) type optical scanning apparatus and an image forming apparatus using the same. More specifically, the present invention facilitates image forming apparatuses in which a light beam (laser beam) emitted from a light source device is reflected and deflected with a rotating polygon mirror serving as a light deflector, and a surface to be scanned is scanned with the light beam through an imaging optical system so as to record image information. Such image forming apparatuses are, for example, laser beam printers, digital photocopiers, and multifunctional printers that have an electro-photographic process.

2. Description of the Related Art

An optical scanning apparatus is commonly used as a scanning optical system for laser beam printers, digital photocopiers, multifunctional printers, and so on. Recently, with the spread of these apparatuses, the demand for higher definition and higher speed has been increased.

An over-filled optical system (hereinafter referred to as OFS) meets the two demands, to increase the definition and to increase the speed. The OFS is characterized in that the number of deflecting surfaces of a rotating polygon mirror can be increased without increasing the size of the rotating polygon mirror. If a multi-beam light source that emits M light beams is used as a laser light source (light source device), the speed can be increased M-fold.

When the number of surfaces of the rotating polygon mirror is N, the effective scanning width on a surface to be scanned is W, the focal length of the imaging optical system is f, and the scanning efficiency is duty, there is the following relationship among N, W, f, and duty:

$$f = WN/(4\pi \cdot \text{duty})$$

According to the above relational expression, the focal length f is proportional to the number of surfaces of the rotating polygon mirror N. Therefore, increasing the number of surfaces causes the optical system to be large.

To solve this problem, various optical scanning apparatuses have been discussed.

An optical scanning apparatus discussed in Japanese Patent Laid-Open No. 2000-267030 (Patent Document 1) is reduced in size because, in the OFS, a converging light beam is incident on the rotating polygon mirror, and imaging is performed at a distance smaller than the focal length of the imaging optical system. Specifically, in the case of a scanning optical system that scans the width in the direction of the short side of A3 size paper (document), whose effective scanning width is 297 mm, when the number of surfaces of the rotating polygon mirror is 12 and the scanning angle is 25.6 degrees, the distance from the deflecting surface to the surface to be scanned is reduced from 437 mm to 305 mm, that is to say, to 68% by causing a converging light beam to be incident on the deflecting surface. In addition, the apparatus of Patent Document 1 is reduced in size by facilitating a tolerance of the fθ performance error up to 0.5% and sacrificing the print-position accuracy in the main scanning direction.

In an optical scanning apparatus discussed in Japanese Patent Laid-Open No. 11-183837 (Patent Document 2), a pair of angled mirrors are disposed between the rotating polygon mirror and the surface to be scanned, and the optical path is folded in the sub-scanning direction, thereby reducing the actual optical-path length to a half of the developed optical-path length.

The optical scanning apparatus of Patent Document 1 has the following problem. Since a converging light beam is incident on the rotating polygon mirror, convergent jitter occurs. In addition, in principle, reduction in the optical-path length causes deterioration in optical performance.

The optical scanning apparatus of Patent Document 2 has the following problem. Since the optical path is folded in the direction of the height of the apparatus, the actual height in the sub-scanning direction increases. In addition, the whole apparatus is complicated (high-cost) due to the increased number of mirror parts.

The OFS is characterized in that the number of surfaces of the rotating polygon mirror can be increased with the size (diameter) of the rotating polygon mirror kept small. In addition, although the diameter is small, the OFS facilitates narrowing down the spot diameter in the main scanning direction because the diameter of the deflected light beam is determined by the width of the deflecting surface (reflecting surface). In the OFS, the number of surfaces has been set to 12 in order to make full use of the characteristics of the multifaceted OFS. In the conventional UFS (under-filled optical system), it can be difficult to set the number of surfaces to 12. However, since the focal length f is proportional to the number N of surfaces as illustrated in the above relational expression, it is inevitable that the apparatus is increased in size. However, if the number of surfaces is reduced, a notable reduction in the diameter of the rotating polygon mirror makes it difficult to manufacture the rotating polygon mirror.

SUMMARY OF THE INVENTION

At least one exemplary embodiment is directed to an optical scanning apparatus in which the spot diameter of the light beam in the main scanning direction is reduced and the whole apparatus is reduced in size without reducing the diameter of the inscribed circle of the rotating polygon mirror more than necessary, and an image forming apparatus using the same.

In a first exemplary embodiment, an optical scanning apparatus includes a light source device, a rotating polygon mirror, an incident optical system, and an imaging optical system. The incident optical system can cause a light beam emitted from a light emitter of the light source device to be incident on a deflecting surface of the rotating polygon mirror. The width of the incident light beam is larger than the width of the deflecting surface in the main scanning plane. The imaging optical system causes the light beam deflected by the rotating polygon mirror to form an image on a surface to be scanned. When the number of deflecting surfaces of the rotating polygon mirror is N, the effective scanning width on the surface to be scanned is W (mm), the wavelength of the light beam emitted from the light source device is $\lambda$ ($\mu$m), and the diameter in the main scanning direction of a spot formed by the light beam on the surface to be scanned is S ($\mu$m), the following conditions are satisfied:

$$N \leq 10$$

$$39 \text{ (mm)} \leq (W \times N \times \lambda)/\{S \cdot \tan(\pi/N)\}.$$

In the first exemplary embodiment, the effective scanning width W can be less than or equal to 214 (mm).

In the first exemplary embodiment, when the diameter of the inscribed circle of the rotating polygon mirror is φ (mm), the following condition can be satisfied:

$(W \times N \times \lambda)/\{\phi \cdot \tan(\pi/N)\} \leq 475$ (μm).

In a second exemplary embodiment, an optical scanning apparatus includes a light source device, a rotating polygon mirror, an incident optical system, and an imaging optical system. The incident optical system can cause a light beam emitted from a light emitter of the light source device to be incident on a deflecting surface of the rotating polygon mirror. The width of the incident light beam is larger than the width of the deflecting surface in the main scanning plane. The imaging optical system causes the light beam deflected by the rotating polygon mirror to form an image on a surface to be scanned. When the number of deflecting surfaces of the rotating polygon mirror is N, the effective scanning width on the surface to be scanned is W (mm), the wavelength of the light beam emitted from the light source device is λ (μm), and the diameter of the inscribed circle of the rotating polygon mirror is φ (mm), the following conditions are satisfied:

$N \leq 10$ $W \leq 310$ (mm)

$(W \times N \times \lambda)/\{\phi \cdot \tan(\pi/N)\} \leq 475$ (μm).

In the second exemplary embodiment, when the diameter in the main scanning direction of a spot formed by the light beam on the surface to be scanned is S (μm), the following condition can be satisfied:

$39$ (mm) $\leq WN\lambda/\{S \cdot \tan(\pi/N)\}$.

In the first or second exemplary embodiment, when the energy of the light beam that can form an image in the center of scanning on the surface to be scanned is Ec, and the energy of the light beam that can form an image at either end of scanning on the surface to be scanned is Ee, the apparatus can further include light quantity correction means such that the following conditions are satisfied:

$N \leq 10$ $\cos(5.6/N) \leq Ee/Ec$.

In the first exemplary embodiment, the diameter S in the main scanning direction of a spot formed by the light beam on the surface to be scanned can be less than or equal to 60 (μm).

In the first or second exemplary embodiment, when the magnification of the imaging optical system in the sub-scanning plane is βs, the angle of the light beam obliquely incident on the deflecting surface of the rotating polygon mirror in the sub-scanning plane is γ (°), and the amount of eccentricity, that is to say, the distance by which the deflecting surface of the rotating polygon mirror moves in the direction of the optical axis of the imaging optical system when the rotating polygon mirror rotates is δ (μm), the following condition can be satisfied:

$\delta \times \beta s \times \tan \gamma \leq 2.5$ (μm).

In a third exemplary embodiment, an image forming apparatus includes the optical scanning apparatus according to the first or second exemplary embodiment, a photoreceptor, a developer, a transferor, and a fixer. The photoreceptor is disposed on the surface to be scanned. An electrostatic latent image is formed on the photoreceptor by the optical scanning apparatus with the light beam. The developer develops the electrostatic latent image into a toner image. The transferor transfers the developed toner image onto a recording medium. The fixer fixes the transferred toner image to the recording medium.

In a fourth exemplary embodiment, an image forming apparatus includes the optical scanning apparatus according to the first or second exemplary embodiment, and a printer controller that converts code data input from an external device into an image signal and inputs the image signal into the optical scanning apparatus.

In a fifth exemplary embodiment, a color image forming apparatus includes a plurality of the optical scanning apparatuses according to the first or second exemplary embodiment, and a plurality of image carriers that are disposed on the surfaces to be scanned by the optical scanning apparatuses and form images in different colors.

In the fifth exemplary embodiment, the color image forming apparatus can further include a printer controller that converts a color signal input from an external device into image data in different colors and inputs the image data into the optical scanning apparatuses.

In at least one exemplary embodiment, the number of surfaces of the rotating polygon mirror is 10 or less, and each conditional expression is set appropriately, thereby preventing and/or reducing deterioration of optical performance due to reduction in the optical-path length, increase in the number of optical parts, and complication (increase in cost) of the whole apparatus. Therefore, the present invention can provide a compact optical scanning apparatus and an image forming apparatus using the same.

Further features of the present invention will become apparent from the following description of exemplary embodiments (with reference to the attached drawings).

DESCRIPTION OF THE EMBODIMENTS

Exemplary embodiments of the present invention will now be described with reference to the drawings.

Exemplary Embodiment 1

Figure 1:
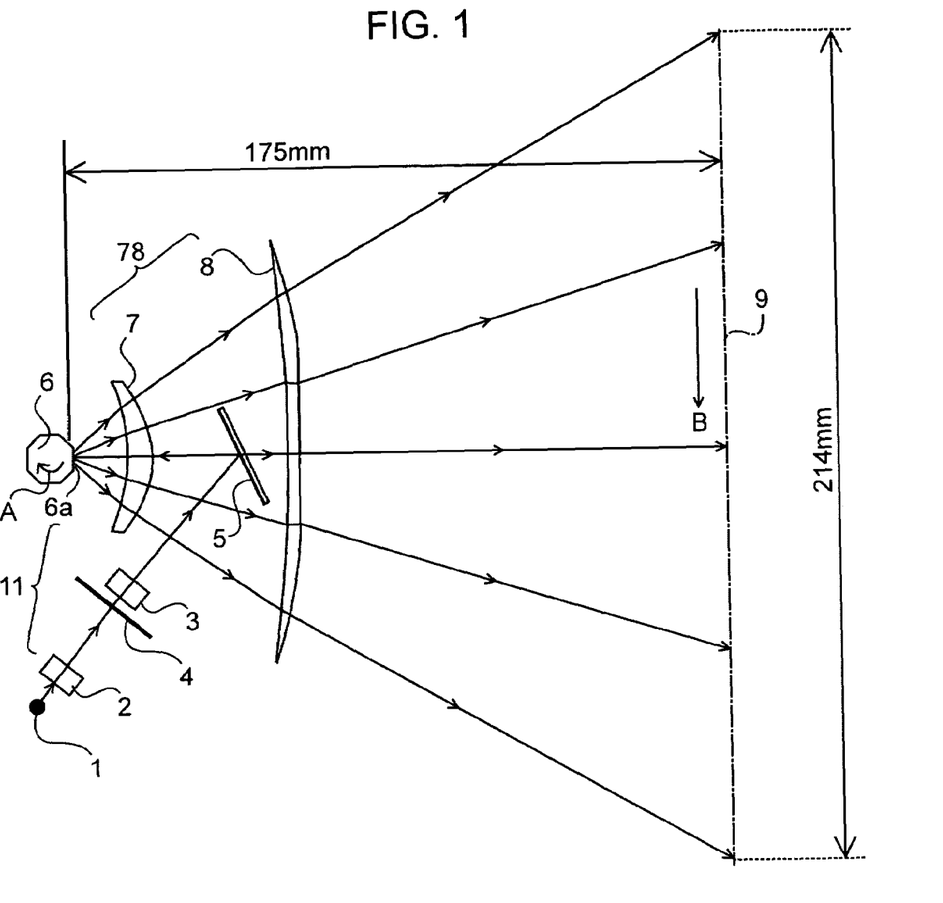
FIG. 1 is a sectional view in the main scanning plane of an optical scanning apparatus according to exemplary embodiment 1 of the present invention.
Figure 2:
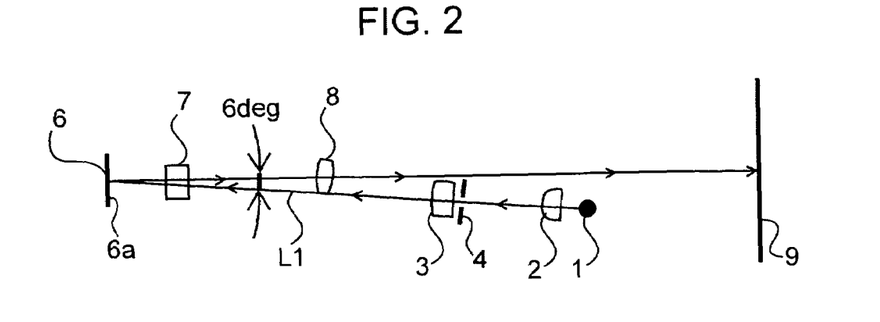
FIG. 2 is a view in the sub-scanning plane of the optical scanning apparatus according to exemplary embodiment 1 of the present invention.

FIG. 1 is a schematic sectional view of an optical scanning apparatus according to exemplary embodiment 1 of the present invention in the main scanning direction (main scanning sectional view). FIG. 2 is a schematic sectional view of the optical scanning apparatus according to exemplary embodiment 1 of the present invention in the sub-scanning direction (sub-scanning sectional view, however, development view with regard to the incident optical system).

Here, the term "main scanning direction" refers to a direction perpendicular to the rotation axis of the rotating polygon mirror (a direction in which a light beam is deflected by reflection (scanned by deflection) by the rotating polygon mirror as shown by arrow B in FIG. 1). The term "sub-scanning direction" refers to a direction parallel to the rotation axis of the rotating polygon mirror. The term "main scanning plane" refers to a plane that is parallel to the main scanning direction and includes the optical axis of the imaging optical system. The term "sub-scanning plane" refers to a plane that is parallel to the optical axis of the imaging optical system and perpendicular to the main scanning plane.

In the figures, reference numeral 1 denotes a light source device, for example, a semiconductor laser, which can have a single light emitter.

Reference numeral 2 denotes a lens system (cylindrical lens). The lens system 2 has a predetermined power only in the sub-scanning plane (sub-scanning direction) and causes the incident light beam to form a substantially linear image on the reflecting surface (deflecting surface) 6a of a below-described rotating polygon mirror 6 in the sub-scanning plane.

Reference numeral 4 denotes an aperture stop. The aperture stop 4 limits the light beam passing through it so as to shape the light beam.

Reference numeral 3 denotes a converging lens. The converging lens 3 converts the state of the light beam limited by the aperture stop 4 into another state.

Alternatively, an optical element that can function as both the cylindrical lens 2 and the converging lens 3 can be used.

Reference numeral 5 denotes a turning mirror. The turning mirror 5 reflects the light beam passing through the converging lens 3 toward the rotating polygon mirror 6.

Reference numeral 6 denotes a light deflector, which can have a circumscribed circle diameter of 7.4 mm and eight surfaces. This is a rotating polygon mirror, and is rotated in the direction shown by arrow A in FIG. 1 at a constant velocity by a driving device (not shown), for example, a motor.

The cylindrical lens 2, the aperture stop 4, the converging lens 3, the turning mirror 5, a below-described first imaging lens 7, and so on constitute a first optical system 11 (incident optical system).

In the present exemplary embodiment, a light beam emitted from the light source devices 1 is made incident on the reflecting surface (deflecting surface) 6a of the rotating polygon mirror 6 by the first optical system 11, in the main scanning plane. The width of the incident light beam is larger than the width of the deflecting surface 6a (OFS (overfilled optical system)).

Reference numeral 78 denotes an imaging optical system (imaging lens system) serving as a second optical system, which can have a collecting function and fθ characteristics. The imaging optical system 78 includes a first imaging lens 7 and a second imaging lens 8. A light beam based on image information is reflected and deflected by the rotating polygon mirror 6 and then forms a spot image on a photosensitive drum surface 9 serving as a surface to be scanned through the imaging optical system 78, in the main scanning plane. In addition, the imaging optical system 78 makes an optically conjugate relationship between the reflecting surface 6a of the rotating polygon mirror 6 and the photosensitive drum surface 9, in the sub-scanning plane, thereby performing tilt reduction.

The first imaging lens 7 is an anamorphic lens having power mainly in the main scanning direction. The first imaging lens 7 causes the light beam reflected and deflected by the rotating polygon mirror 6 at a constant angular velocity to form an image mainly in the main scanning direction. In addition, the first imaging lens 7 has fθ characteristics so that the surface 9 to be scanned is scanned at a constant velocity. The second imaging lens 8 causes the light beam transmitted by the first imaging lens 7 to form an image on the surface 9 to be scanned, mainly in the sub-scanning direction. In addition, the second imaging lens 8 makes a conjugate relationship between the deflecting surface 6a and the photosensitive drum surface 9, thereby performing tilt reduction of the deflecting surface of the rotating polygon mirror 6. Moreover, in order to improve the imaging performance of the light beam that is conically scanned and incident, and the curvature of the scanning line, and to maintain a constant magnification in the sub-scanning direction (sub-scanning magnification), the sagittal radius-of-curvature changes in the main scanning direction on both sides of the second imaging lens 8, and the second imaging lens 8 is disposed eccentrically so that the incident light beam passes above the sagittal optical axis.

Reference numeral 9 denotes a photosensitive drum surface as a surface to be scanned. On the surface, a spot scans at a constant velocity in the main scanning direction.

In the present exemplary embodiment, the light beam emitted from the semiconductor laser 1 passes through the cylindrical lens 2. In the main scanning plane, the light beam is simply transmitted, but, in the sub-scanning plane, it is converted into a parallel light beam. The light beam passes through the aperture stop 4, and is incident on the converging lens 3. The converging lens 3 converts the incident light beam into weakly divergent light beam in the main scanning plane. The converted weakly divergent light beam is incident on the first imaging lens 7 through the turning mirror 5, and is converted into a parallel light beam. The converted parallel light beam is incident on the rotating polygon mirror 6 from the optical axis of the first imaging lens 7. The width of the incident light beam is larger than the width of the reflecting surface 6a in the main scanning direction (OFS).

In the sub-scanning plane, the converging lens 3 converts the incident light beam into a convergent light beam. The converted convergent light beam passes through the first imaging lens 7 and forms a linear image in the vicinity of the reflecting surface of the rotating polygon mirror 6. The linear image is elongated in the main scanning direction. As illustrated in FIG. 2, in the sub-scanning plane, the optical axis L1 of the semiconductor laser 1, the cylindrical lens 2, and the converging lens 3 is tilted at 3 degrees to the plane perpendicular to the reflecting surface 6a of the rotating polygon mirror 6 so as to prevent the light beam incident on the rotating polygon mirror 6 from interfering with the light beam reflected by the rotating polygon mirror 6 (oblique incidence optical system).

The light beam reflected and deflected by the reflecting surface 6a of the rotating polygon mirror 6 passes through the first and second imaging lenses 7 and 8 and forms a spot image on the photosensitive drum surface 9. By rotating the rotating polygon mirror 6 in the direction of arrow A, the photosensitive drum surface 9 is scanned with the light beam in the direction of arrow B (main scanning direction). In this way, image recording is performed on the photosensitive drum surface 9 serving as a recording medium.

In the present exemplary embodiment, when the number of deflecting surfaces of the rotating polygon mirror 6 is N, the effective scanning width on the surface 9 to be scanned is W (mm), the wavelength (center wavelength) of the light beam emitted from the light source device 1 is $\lambda$ (μm), and the spot diameter on the surface 9 to be scanned in the main scanning direction is S (μm), the following conditions are satisfied:

$$N \leq 10$$

$$39 \text{ (mm)} \leq (W \times N \times \lambda)/\{S \cdot \tan(\pi/N)\} \tag{1}$$

In addition, in the present exemplary embodiment, when the diameter of the inscribed circle of the rotating polygon mirror 6 is $\phi$ (mm), the following condition is satisfied:

$$(W \times N \times \lambda)/\{\phi \cdot \tan(\pi/N)\} \leq 475 \text{ (μm)} \tag{2}$$

Next, technical meaning of the conditional expressions (1) and (2) will be described.

The conditional expression (1) illustrates the condition for ensuring the spot diameter in the main scanning direction and the size of the rotating polygon mirror. If the conditional expression (1) is not satisfied, it is substantially difficult to manufacture the rotating polygon mirror. The diameter of the inscribed circle of the rotating polygon mirror is too small, and therefore it can be difficult to machine the rotating polygon mirror. In addition, the width of the reflecting surface is too small, and therefore it can be difficult to evaluate the flatness of the reflecting surface.

The reflecting surfaces of the rotating polygon mirror are formed by cutting with a high degree of accuracy. The profile irregularity requires a SAG of 0.1 $\lambda$ or less in the width direction (main scanning direction) of the reflecting surface. SAG is a PV value when the shape of a surface is approximated by a cylindrical surface. The reflecting surface formed by cutting tends to have crookedness in cutting at both ends in the main scanning direction. The amount of crookedness is substantially constant regardless of the size of the reflecting surface. In the case where the shape of the surface is defined with the SAG, when the width of the reflecting surface is small, the amount of crookedness strongly influences as a SAG.

By satisfying the conditional expression (1), the spot diameter in the main scanning direction can be reduced. In addition, the size of the rotating polygon mirror can be optimized so as not to make it difficult to manufacture the rotating polygon mirror.

The conditional expression (2) illustrates the condition for preventing the diameter of the inscribed circle of the rotating polygon mirror from being smaller than necessary when the targeted spot diameter in the main scanning direction is 60 μm or less. The numeric value of the right-hand side of the conditional expression (2) illustrates the condition for substantially facilitating manufacturing. In the case where the effective scanning width in the direction of the short side of the sheet is 310 mm or less, the wavelength of the laser ranges from 0.405 μm to 0.78 μm, when the condition is satisfied, a diameter of the inscribed circle of the rotating polygon mirror of 5 mm or more can be ensured, and therefore the difficulty in machining the rotating polygon mirror can be avoided. In addition, the width of the reflecting surface can be ensured, and therefore the flatness can be evaluated.

The diameter of the rotating shaft of the rotating polygon mirror is approximately 3 mm. Therefore, the diameter of the inscribed circle of 5 mm is almost the limit of machining. By satisfying conditional expression (2), the spot diameter in the main scanning direction can be reduced, and the size of the rotating polygon mirror such that manufacturing is not difficult can be ensured.

Next, a method for deriving conditional expressions (1) and (2) will be described.

(1-1) When the diameter of the inscribed circle of the rotating polygon mirror 6 is $\Phi$ (mm), the f$\theta$ coefficient of the imaging optical system 78 is f$\theta$, and the spot diameter in the main scanning direction is S (μm), $$\Phi = d/\tan(\pi/N) \tag{a}$$

$$d = f\theta/Fno \tag{b}$$

$$f\theta = WN/(4\pi \cdot 0.9) = WN/3.6\pi \tag{c}$$

$$Fno = S(k\lambda) = S/1.43\lambda \tag{d}$$

From relational expressions (b), (c), and (d), $$d = 1.43 WN\lambda/(3.6\pi S) \tag{e}$$

From relational expression (e), $$7.9\Phi = WN\lambda/(S \cdot \tan(\pi/N)) \tag{f}$$

According to our study, the rotating polygon mirror can be easily manufactured when $\Phi \geq 4.9$ (mm). Therefore, $$39 \text{ (mm)} \leq WN\lambda/(S \cdot \tan(\pi/N)) \tag{1}$$

(2-1) When the diameter of the inscribed circle of the rotating polygon mirror 6 is $\Phi$ (mm), the f$\theta$ coefficient of the imaging optical system 78 is f$\theta$, and the spot diameter in the main scanning direction is S (μm), $$\Phi = d/\tan(\pi/N) \tag{a}$$

$$d = f\theta/Fno \tag{b}$$

$$f\theta = WN/(4\pi \cdot 0.9) = WN/3.6\pi \tag{c}$$

$$Fno = S(k\pi) = S/1.43\lambda \tag{d}$$

From relational expressions (b), (c), and (d), $$d = 1.43 WN\lambda/(3.6\pi S) \tag{e}$$

From relational expression (e), $$S = 0.12644 \cdot WN\lambda/(\Phi \cdot \tan(\pi/N)) \tag{g}$$

If the spot diameter S in the main scanning direction is not set to a predetermined value or less, a high-definition image cannot be obtained. In addition, the diameter of the polygon mirror (the diameter of the inscribed circle $\Phi$) is too small, and therefore manufacturing is difficult. Therefore, the appropriate spot diameter S in the main scanning direction is 60 μm or less.

Therefore, $$(W \times N \times \lambda)/\{\phi \cdot \tan(\pi/N)\} \leq 475 \text{ (μm)} \tag{2}$$

In this exemplary embodiment, when the magnification of the imaging optical system 78 in the sub-scanning plane is $\beta s$, the oblique incidence angle of the light beam obliquely incident on the deflecting surface of the rotating polygon mirror 6 in the sub-scanning plane is γ (°), and the amount of eccentricity, that is to say, the distance by which the deflecting surface of the rotating polygon mirror 6 moves in the direction of the optical axis of the imaging optical system 78 when the rotating polygon mirror 6 rotates is δ (μm), the following condition is satisfied:

$$\delta \times \beta s \times \tan \gamma \leq 2.5 \text{ (μm)} \quad (3)$$

The definition of the amount of eccentricity δ (μm) will be described in detail. The eccentricity occurs, for example, when the rotating shaft is not located in the center of the rotating polygon mirror. The distance from each reflecting surface of the rotating polygon mirror to the rotating shaft is not constant. Therefore, when the rotating polygon mirror rotates, the position of the reflecting surface is displaced in the radial direction. The maximum value of the amount of displacement in one revolution is the amount of eccentricity δ.

The conditional expression (3) illustrates the condition for determining an amount of eccentricity such that pitch-variation is 5 μm or less. When the pitch variation on the surface 9 to be scanned is M (μm), $$M = 2\delta \cdot \beta s \cdot \tan \gamma$$

Therefore, the conditional expression satisfying the pitch variation M of 5 μm is as follows:

$$\delta \times \beta s \times \tan \gamma \leq 2.5 \text{ (μm)} \quad (3)$$

Since the OFS is an oblique incidence optical system, the surface eccentricity causes pitch variation. To control this can be useful for preventing image deterioration.

In general, the amount of eccentricity δ (μm) of the reflecting surface of a polygon motor unit is approximately 50 μm or less. In the case of high-accuracy ones, it is 20 μm or less. The angle of oblique incidence is determined by the arrangement of the optical path. In consideration of deterioration of imaging performance of the spot, the angle can be at most 5 degrees. When the design values of δ and γ are determined, βs limiting the pitch variation to 5 μm is inevitably obtained from conditional expression (3).

The optical scanning apparatus of the present exemplary embodiment scans A4 size paper (document) in the direction of the short side. Therefore, the effective scanning width W can be reduced to approximately 214 mm, and the size of the whole apparatus can be easily reduced.

In addition, the diameter of the inscribed circle of the rotating polygon mirror φ necessary for obtaining a predetermined spot diameter S in the main scanning direction is also small, and can be closest to the limit of machining. The rotating polygon mirror 6 is desirably as small as possible in order to reduce the load on the motor.

The following are examples of numeric values of the optical scanning apparatus in the present exemplary embodiment, which facilitates scanning in the direction of the short side of A4 size paper (W=214 mm).

The number of surfaces of the rotating polygon mirror N=8, the diameter of the inscribed circle φ=6.8 mm, the focal length of the imaging optical system f=150 mm, the wavelength λ=0.78 μm, the effective scanning width W=214 mm, the scanning efficiency duty=0.9, and the spot diameter in the main scanning direction S=60 μm.

Table 1 shows examples of numeric values of the spot diameter S (μm) in the main scanning direction, the diameter φ (mm) of the inscribed circle of the rotating polygon mirror, and conditional expression (1).

TABLE 1

A4 eight-surface OFS
Scanning width W: 214 mm
Number of surfaces N: 8
Wavelength λ: 0.78 μm

| S (μm) | φ (mm) | $WN\lambda/(S \cdot \tan(\pi/N))$ (mm) |
|---|---|---|
| 20 | 20.38 | 161.19 |
| 30 | 13.59 | 107.46 |
| 40 | 10.19 | 80.60 |
| 50 | 8.15 | 64.48 |
| 60 | 6.79 | 53.73 |
| 80 | 5.10 | 40.30 |
| 82.6 | 4.93 | 39.03 |
| 85 | 4.80 | 37.93 |
| 100 | 4.08 | 32.24 |

From Table 1, the numeric value of conditional expression (1) of the present exemplary embodiment is $$WN\lambda/(S \cdot \tan(\pi/N)) = 53.73 \text{ (mm)}$$

This satisfies conditional expression (1). The numeric value of conditional expression (2) of the present exemplary embodiment is $$WN\lambda/(\phi \cdot \tan(\pi/N)) = 474.5 \text{ (μm)}$$

This satisfies conditional expression (2).

As illustrated in Table 1, when the numeric value of conditional expression (1) is 39 (mm), the diameter φ of the inscribed circle of the rotating polygon mirror is 4.93 (mm). This numeric value is almost the limit of machining.

Figure 3:
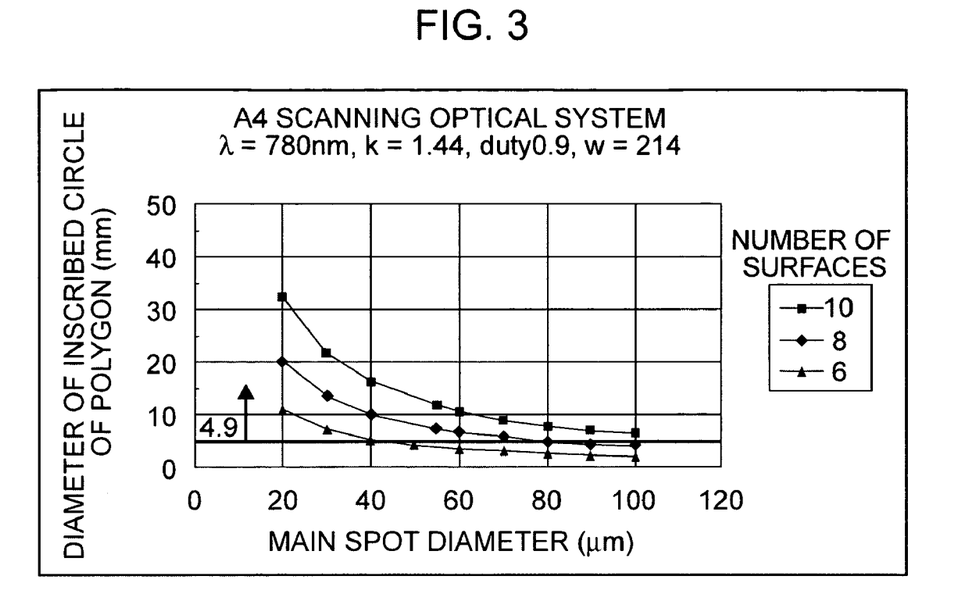
FIG. 3 illustrates the relationship between the main scanning spot diameter and the diameter of the inscribed circle of the polygon in exemplary embodiment 1 of the present invention.

FIG. 3 illustrates the relationship between the spot diameter S in the main scanning direction and the diameter φ of the inscribed circle of the rotating polygon mirror in a scanning optical system that scans A4 size paper. The figure illustrates the case where the number N of surfaces is ten, the case where the number N of surfaces is eight, and the case where the number N of surfaces is six. The machining limit on the diameter φ of the inscribed circle is approximately 4.9 (mm). Conditional expression (1) illustrates the configuration of an optical system that can be designed with φ≧4.9.

As described above, in the present exemplary embodiment, since the number N of surfaces of the rotating polygon mirror 6 is ten or less, scanning is at a wide-angle for an OFS, and the focal length of the imaging optical system can be reduced depending on the effective scanning width. The optical-path reduction rate is 83% in the case of the ten-surface OFS, 67% in the case of the eight-surface OFS, and 50% in the case of the six-surface OFS compared to the case of a conventional twelve-surface OFS. Configuring the optical system so as to satisfy the above conditional expressions makes it possible to keep the diameter of the inscribed circle of the rotating polygon mirror within the easily manufacturable range, and to reduce the optical path length without deteriorating optical performance and without increasing the cost due to increase in the number of parts.

Exemplary Embodiment 2

Next, exemplary embodiment 2 will be described.

In the present exemplary embodiment, the difference from exemplary embodiment 1 is that the present invention is applied to an apparatus whose effective scanning width W is 310 mm (A3 size paper) or less. Other configurations and optical effects are the same as those of exemplary embodiment 1, and the same advantages are obtained.

In the present exemplary embodiment, when the number of deflecting surfaces of the rotating polygon mirror 6 is N, the effective scanning width on the surface 9 to be scanned is W (mm), the wavelength (center wavelength) of the light beam emitted from the light source device 1 is λ (μm), and the diameter of the inscribed circle of the rotating polygon mirror 6 is φ (μm), the following conditions are satisfied:

$$N \leq 10$$

$$W \leq 310 \text{ (mm)}$$

$$(W \times N \times \lambda)/\{\phi \cdot \tan(\pi/N)\} \leq 475 \text{ (μm)} \quad (2)$$

The following are examples of numeric values of the optical scanning apparatus in the present exemplary embodiment, which facilitates scanning in the direction of the short side of A3-size-paper (W=310 mm).

The number of surfaces of the rotating polygon mirror N=8, the diameter of the inscribed circle φ=9.34 mm, the focal length of the imaging optical system f=219 mm, the wavelength λ=0.78 μm, the effective scanning width W=310 mm, the scanning efficiency duty=0.9, and the spot diameter in the main scanning direction S=60 μm.

Table 2 shows examples of numeric values of the spot diameter S (μm) in the main scanning direction, the diameter φ (mm) of the inscribed circle of the rotating polygon mirror, and conditional expression (1).

TABLE 2

A3 eight-surface OFS
Scanning width W: 310 mm
Number of surfaces N: 8
Wavelength λ: 0.78 μm

| S (μm) | φ (mm) | WNλ/(S · tan(π/N)) (mm) |
|---|---|---|
| 20 | 29.52 | 233.50 |
| 30 | 19.68 | 155.67 |
| 40 | 14.76 | 116.75 |
| 50 | 11.81 | 93.40 |
| 60 | 9.84 | 77.83 |
| 80 | 7.38 | 58.38 |
| 82.6 | 7.15 | 56.54 |
| 85 | 6.95 | 54.94 |
| 100 | 5.90 | 46.70 |

From Table 2, the numeric value of conditional expression (1) of the present exemplary embodiment is $$WN\lambda/(S \cdot \tan(\pi/N)) = 77.83 \text{ (mm)}$$

This satisfies conditional expression (1). The numeric value of conditional expression (2) of the present exemplary embodiment is $$WN\lambda/(\phi \cdot \tan(\pi/N)) = 474.5 \text{ (μm)}$$

This satisfies conditional expression (2). As described above, when the numeric value of conditional expression (1) is 39 (mm), the diameter φ of the inscribed circle of the rotating polygon mirror is 4.93 (mm). This numeric value is almost the limit of machining. In the present exemplary embodiment, the diameter φ of the inscribed circle of the rotating polygon mirror is 9.84 (mm) as illustrated in Table 2.

Figure 4:
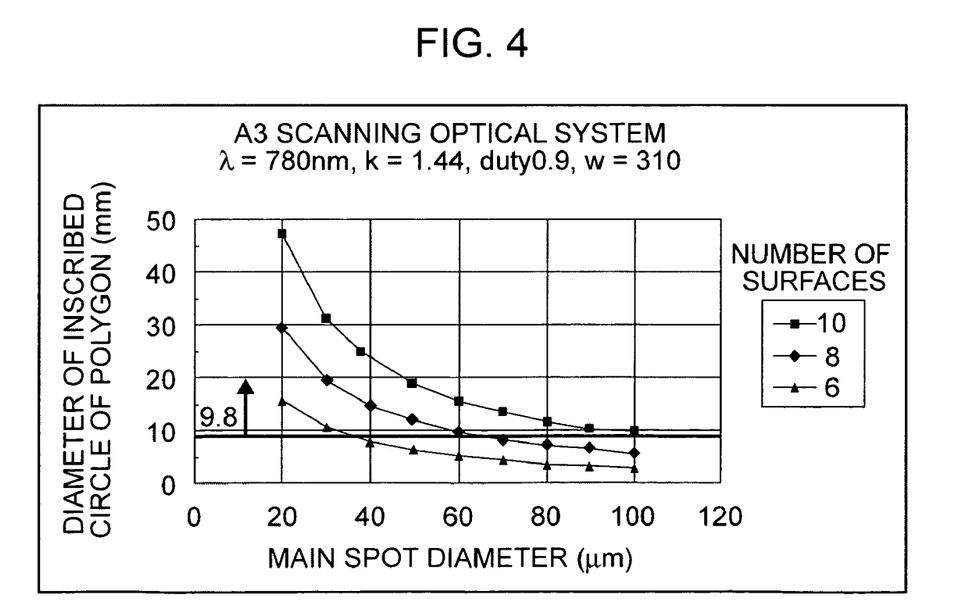
FIG. 4 illustrates the relationship between the main scanning spot diameter and the diameter of the inscribed circle of the polygon in exemplary embodiment 2 of the present invention.

FIG. 4 illustrates the relationship between the spot diameter S in the main scanning direction and the diameter φ of the inscribed circle of the rotating polygon mirror in a scanning optical system that scans A3 size paper. The figure illustrates the case where the number N of surfaces is ten, the case where the number N of surfaces is eight, and the case where the number N of surfaces is six. As described above, the machining limit on the diameter φ of the inscribed circle is approximately 4.9 (mm). In the present exemplary embodiment, the diameter φ of the inscribed circle of the rotating polygon mirror is 9.84 (mm). Conditional expression (1) illustrates the configuration of an optical system that can be designed with φ≥4.9.

Exemplary Embodiment 3

Next, exemplary embodiment 3 will be described.

In the present exemplary embodiment, the difference from exemplary embodiments 1 and 2 is that a light-quantity correcting device is provided in the optical path. The light-quantity correcting device can adjust the energy (light quantity) of the light beam that can form an image in the center of scanning on the surface to be scanned and the energy (light quantity) of the light beam that can form an image at either end of scanning on the surface to be scanned. Other configurations and optical effects are the same as those of exemplary embodiments 1 and 2, and the same advantages are obtained.

Figure 7:
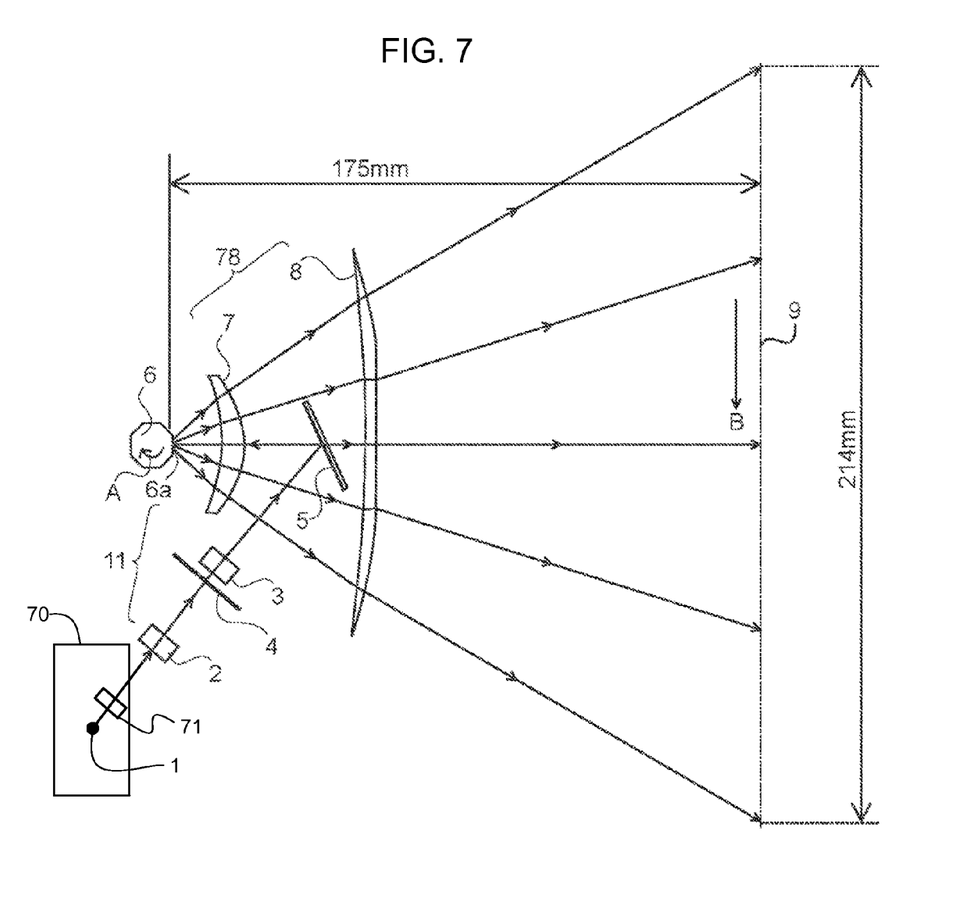
FIG. 7 is a sectional view in the main scanning plane of an optical scanning apparatus according to an exemplary embodiment of the present invention.

The light-quantity correcting device 70 provided in the optical path is, for example, a device 70 for moving the laser 1 and a collimator lens 71 in a direction corresponding to the main scanning direction (in the direction perpendicular to the optical axis in the plane of the paper in FIG. 1) as shown in FIG. 7, a device for inserting a gradation filter in the incident optical path, or a device for rotating the turning mirror 5 in FIG. 1 in the plane of the paper. Every device has a function of changing the light-quantity distribution of the light beam incident on the deflecting surface in the main scanning direction. Therefore, the light beam deflected and scanned has an even illuminance distribution on the surface to be scanned.

Alternatively, the illuminance distribution on the surface to be scanned can be evened without providing the light-quantity correcting device in the optical path, by changing and controlling the light quantity emitted by the laser during scanning.

That is to say, in the present exemplary embodiment, when the energy (light quantity) of the light beam that can form an image in the center of scanning on the surface to be scanned is Ec, and the energy (light quantity) of the light beam that can form an image at either end of scanning on the surface to be scanned is Ee, adjustment is performed with the light-quantity correcting device so as to satisfy the following condition:

$$\cos(5.6/N) \leq Ee/Ec \quad (4)$$

Conditional expression (4) illustrates the condition for preventing the OFS-specific illuminance distribution (energy distribution of the spot formed on the surface to be scanned) from increasing due to performing wide-angle scanning with a small number (ten or less) of deflecting surfaces. If conditional expression (4) is not satisfied, appropriate illuminance distribution cannot be obtained on the surface to be scanned.

The light-quantity correcting device is a device for flattening the intensity distribution of a laser beam approximated by the Gaussian distribution. For example, the light-quantity correcting device cuts out the central portion of the laser light with the FNo (F number) in the main scanning direction of the first optical system so as to flatten the intensity distribution, optimizes the sub-scanning shape of the aperture stop so as to change the intensity distribution of the laser beam, or optimizes the Fresnel transmittance of optical parts to equalize the illuminance distribution of the scanning light beam.

In each exemplary embodiment, the imaging optical system 6 includes two lenses. However, the present invention is not limited to this. The imaging optical system 6 can be a single lens or composed of three lenses or more. Alternatively, the imaging optical system can include a diffraction optical system. In the present exemplary embodiment, the light source device has a single light emitter. However, the present invention is not limited to this. The light source device can have a plurality of light emitters. In this case, speeding up can be achieved.

Image Forming Apparatus

Figure 5:
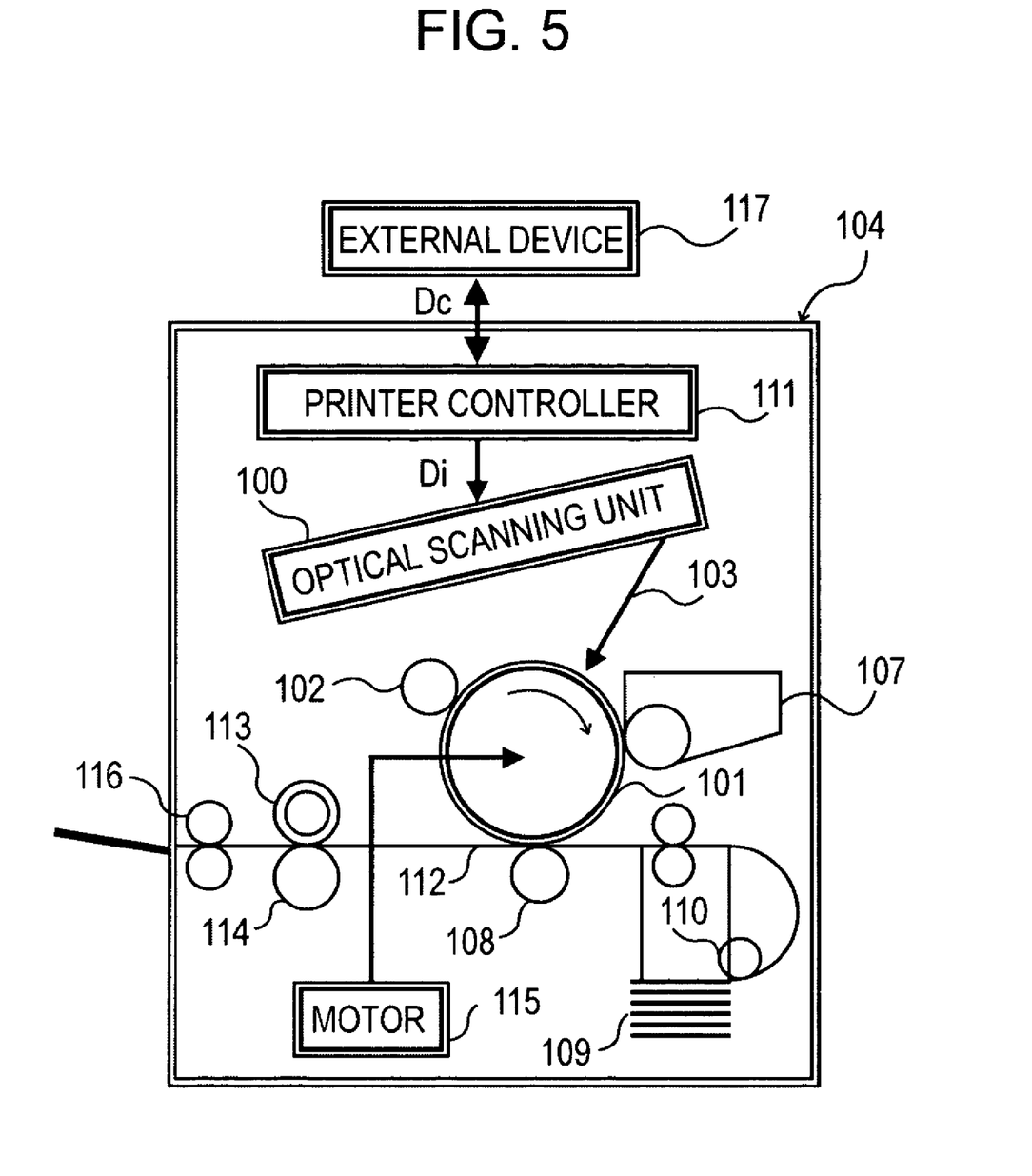
FIG. 5 is a sectional view in the sub-scanning plane showing an exemplary embodiment of an image forming apparatus of the present invention.

FIG. 5 is a schematic sectional view in the sub-scanning direction, showing an exemplary embodiment of an image forming apparatus of the present invention. In the figure, reference numeral 104 denotes the image forming apparatus. Into this image forming apparatus 104, code data Dc is input from an external device 117 (e.g., a personal computer). This code data Dc is converted into image data (dot data) Di by a printer controller 111 in the apparatus. This image data Di is input into an optical scanning unit 100 according to any one of exemplary embodiments 1 to 3. This optical scanning unit 100 emits a light beam 103 that is modulated according to the image data Di. With this light beam 103, the optical scanning unit 100 scans a photosensitive surface of a photosensitive drum 101 in the main scanning direction.

The photosensitive drum 101, which is an electrostatic-latent-image carrier (photoreceptor), is clockwise rotated by a motor 115. With this rotation, the photosensitive surface of the photosensitive drum 101 moves relative to the light beam 103 in the sub-scanning direction, which is perpendicular to the main scanning direction. A charging roller 102 is disposed above the photosensitive drum 101, and it is in contact with the surface of the photosensitive drum 101. The charging roller 102 uniformly charges the surface of the photosensitive drum 101. The surface of the photosensitive drum 101 charged by the charging roller 102 is then scanned by the optical scanning unit 100 with the light beam 103.

As described above, the light beam 103 is modulated according to the image data Di. Irradiation by the light beam 103 forms an electrostatic latent image on the surface of the photosensitive drum 101. This electrostatic latent image is developed into a toner image by a developer 107. The developer 107 is disposed downstream in the rotation direction of the photosensitive drum 101 from the position irradiated with the light beam 103, and it is in contact with the photosensitive drum 101.

The toner image developed by the developer 107 is transferred onto a recording medium, more specifically a sheet 112 of paper, by a transferring roller 108. The transferring roller 108 is disposed below the photosensitive drum 101 and faces the photosensitive drum 101. The sheets 112 are contained in a sheet cassette 109 in front of the photosensitive drum 101 (on the right side of FIG. 5). The sheets 112 can also be fed manually. A sheet feeding roller 110 is disposed at one end of the sheet cassette 109, and it feeds the sheets 112 contained in the sheet cassette 109 into a conveyance path.

The toner image is thus transferred onto the sheet 112, and the sheet 112 with the unfixed toner image thereon is then carried to a fixer behind the photosensitive drum 101 (on the left side of FIG. 5). The fixer includes a fixing roller 113, which can have a fixing heater (not shown) therein, and a pressing roller 114 pressed against the fixing roller 113. The sheet 112 is carried from the transferring roller 108 to the fixer, and the fixer presses and heats the sheet 112 between the fixing roller 113 and the pressing roller 114 so as to fix the unfixed toner image to the sheet 112. A sheet-discharging roller 116 is disposed behind the fixing roller 113. The sheet-discharging roller 116 discharges the sheet 112 with the fixed toner image from the image forming apparatus.

Although not shown in FIG. 5, the printer controller 111 not only converts data as described above, but also controls the motor 115, other units in the image forming apparatus, and a polygon motor in the optical scanning unit.

The recording density of the image forming apparatus used in at least one exemplary embodiment is not limited. However, considering that the higher the recording density, the higher the required image quality is, exemplary embodiments 1 and 2 of the present invention are suitable for an image forming apparatus that has a recording density of 1200 dpi or more.

Color Image Forming Apparatus

Figure 6:
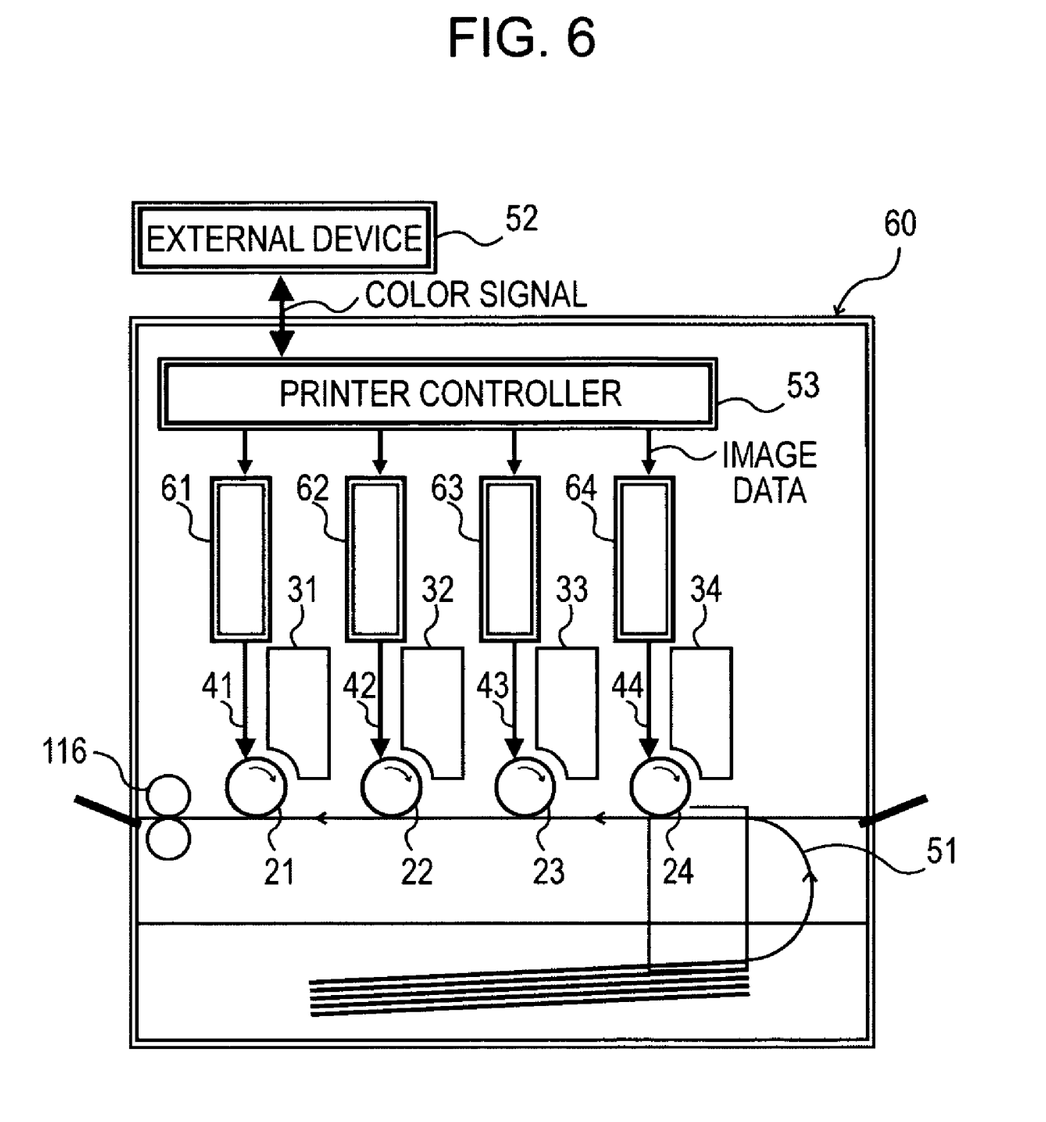
FIG. 6 is a schematic view of a color image forming apparatus according to an exemplary embodiment of the present invention.

FIG. 6 is a schematic view of a color image forming apparatus according to an exemplary embodiment of the present invention. The present exemplary embodiment is a tandem-type color image forming apparatus including an array of four optical scanning apparatuses. The optical scanning apparatuses record image information in parallel on the surfaces of photosensitive drums serving as image carriers. In FIG. 6, reference numeral 60 denotes the color image forming apparatus while reference numeral 60b denotes the color image forming apparatus, reference numerals 61, 62, 63, and 64 denote the optical scanning apparatuses according to any one of exemplary embodiments 1 to 3, reference numerals 21, 22, 23, and 24 denote photosensitive drums serving as image carriers, reference numerals 31, 32, 33, and 34 denote developers; and reference numeral 51 denotes a conveyer belt.

In FIG. 6, color signals of R (red), G (green), and B (blue) are input into the color image forming apparatus 60 from an external device 52 (e.g., a personal computer). These color signals are converted into image data (dot data) of C (cyan), M (magenta), Y (yellow), and B (black) by a printer controller 53 in the apparatus. These image data are input into the optical scanning apparatuses 61, 62, 63, and 64. These optical scanning apparatuses emit light beams 41, 42, 43, and 44 that are modulated according to the image data. The photosensitive surfaces of the photosensitive drums 21, 22, 23, and 24 are scanned with the light beams in the main scanning direction.

The color image forming apparatus of the present exemplary embodiment has an array of four optical scanning apparatuses 61, 62, 63, and 64 corresponding to C (cyan), M (magenta), Y (yellow), and B (black). The optical scanning apparatuses record image signals (image information) in parallel on the surfaces of the photosensitive drums 21, 22, 23, and 24 so as to print a color image at high speed.

In the color image forming apparatus of the present exemplary embodiment, as described above, the four optical scanning apparatuses 61, 62, 63, and 64 form latent images of C, M, Y, and B on the surfaces of the corresponding photosensitive drums 21, 22, 23, and 24 using light beams based on the image data. Next, multiple transfer to a recording medium is performed so as to form a full-color image.

The external device 52 can also be, for example, a color image scanner (e.g., one, which can have a CCD sensor). In this case, the color image scanner and the color image forming apparatus 60 constitute a color digital photocopier.

While the present invention has been described with reference to exemplary embodiments, it is to be understood that the invention is not limited to the discussed exemplary embodiments. The scope of the following claims is to be accorded the broadest interpretation so as to encompass all modifications, equivalent structures and functions.

This application claims the benefit of Japanese Application No. 2005-065375 filed Mar. 9, 2005, which is hereby incorporated by reference herein in its entirety.

What is claimed is:

1. An optical scanning apparatus comprising:
a light source device;
a rotating polygon mirror;
an incident optical system that causes a light beam emitted from a light emitter of the light source device to be incident on a deflecting surface of the rotating polygon mirror, the width of the incident light beam being larger than the width of the deflecting surface in the main scanning plane; and
an imaging optical system that causes the light beam deflected by the rotating polygon mirror to form an image on a surface to be scanned,
wherein when the number of deflecting surfaces of the rotating polygon mirror is N, the effective scanning width on the surface to be scanned is W (mm), the wavelength of the light beam emitted from the light source device is $\lambda$ ($\mu$m), and the diameter in the main scanning direction of a spot formed by the light beam on the surface to be scanned is S ($\mu$m), the following conditions are satisfied:

$N \leq 10$ $39 \text{ (mm)} \leq (W \times N \times \lambda)/\{S \cdot \tan(\pi/N)\}$, and wherein when the magnification of the imaging optical system in the sub-scanning plane is $\beta s$, the angle of the light beam obliquely incident on the deflecting surface of the rotating polygon mirror in the sub-scanning plane is $\gamma$ (°), and the amount of eccentricity, that is to say, the distance by which the deflecting surface of the rotating polygon mirror moves in the direction of the optical axis of the imaging optical system when the rotating polygon mirror rotates is $\delta$ ($\mu$m), the following condition is satisfied:

$\delta \times \beta s \times \tan \gamma \leq 2.5$ ($\mu$m).

2. The optical scanning apparatus according to claim 1, wherein the effective scanning width W is less than or equal to 214 (mm).

3. The optical scanning apparatus according to claim 1, wherein when the diameter of the inscribed circle of the rotating polygon mirror is $\phi$ (mm), the following condition is satisfied:

$(W \times N \times \lambda)/\{\phi \cdot \tan(\pi/N)\} \leq 475$ ($\mu$m).

4. The optical scanning apparatus according to claim 1, wherein when the energy of the light beam that forms an image in the center of scanning on the surface to be scanned is Ec, and the energy of the light beam that forms an image at either end of scanning on the surface to be scanned is Ee, the apparatus further includes light quantity correction means such that the following conditions are satisfied:

$N \leq 10$ $\cos(5.6/N) \leq Ee/Ec$.

5. The optical scanning apparatus according to claim 1, wherein the diameter S in the main scanning direction of a spot formed by the light beam on the surface to be scanned is less than or equal to 60 ($\mu$m).

6. An image forming apparatus comprising:
the optical scanning apparatus according to claim 1;
a photoreceptor disposed on the surface to be scanned;
a developer developing an electrostatic latent image into a toner image, the electrostatic latent image being formed on the photoreceptor by the optical scanning apparatus with the light beam;
a transferor transferring the developed toner image onto a recording medium; and
a fixer fixing the transferred toner image to the recording medium.

7. An image forming apparatus comprising:
the optical scanning apparatus according to claim 1; and
a printer controller that converts code data input from an external device into an image signal and inputs the image signal into the optical scanning apparatus.

8. A color image forming apparatus comprising:
a plurality of the optical scanning apparatuses according to claim 1; and
a plurality of image carriers that are disposed on the surfaces to be scanned by the optical scanning apparatuses and form images in different colors.

9. The color image forming apparatus according to claim 8, further comprising a printer controller that converts a color signal input from an external device into image data in different colors and inputs the image data into the optical scanning apparatuses.

10. An optical scanning apparatus comprising:
a light source device;
a rotating polygon mirror;
an incident optical system that causes a light beam emitted from a light emitter of the light source device to be incident on a deflecting surface of the rotating polygon mirror, the width of the incident light beam being larger than the width of the deflecting surface in the main scanning plane; and
an imaging optical system that causes the light beam deflected by the rotating polygon mirror to form an image on a surface to be scanned,
wherein when the number of deflecting surfaces of the rotating polygon mirror is N, the effective scanning width on the surface to be scanned is W (mm), the wavelength of the light beam emitted from the light source device is $\lambda$ ($\mu$m), and the diameter of the inscribed circle of the rotating polygon mirror is $\phi$ (mm), the following conditions are satisfied:

$N \leq 10$ $W \leq 310$ (mm)

$(W \times N \times \gamma)/\{\phi \cdot \tan(\pi/N)\} \leq 475$ ($\mu$m), and wherein when the magnification of the imaging optical system in the sub-scanning plane is $\beta s$, the angle of the light beam obliquely incident on the deflecting surface of the rotating polygon mirror in the sub-scanning plane is γ (°), and the amount of eccentricity, that is to say, the distance by which the deflecting surface of the rotating polygon mirror moves in the direction of the optical axis of the imaging optical system when the rotating polygon mirror rotates is δ (μm), the following condition is satisfied:

$$\delta \times \beta s \times \tan \gamma \leq 2.5 \ (\mu m).$$

11. The optical scanning apparatus according to claim 10, wherein when the diameter in the main scanning direction of a spot formed by the light beam on the surface to be scanned is S (μm), the following condition is satisfied:

$$39 \ (mm) \leq WN\lambda/\{S \cdot \tan(\pi/N)\}.$$

12. The optical scanning apparatus according to claim 10, wherein when the energy of the light beam that forms an image in the center of scanning on the surface to be scanned is Ec, and the energy of the light beam that forms an image at either end of scanning on the surface to be scanned is Ee, the apparatus further includes light quantity correction means such that the following conditions are satisfied:

$$N \leq 10$$

$$\cos(5.6/N) \leq Ee/Ec.$$

13. An image forming apparatus comprising:
the optical scanning apparatus according to claim 10;
a photoreceptor disposed on the surface to be scanned;
a developer developing an electrostatic latent image into a toner image, the electrostatic latent image being formed on the photoreceptor by the optical scanning apparatus with the light beam;
a transferor transferring the developed toner image onto a recording medium; and
a fixer fixing the transferred toner image to the recording medium.

14. An image forming apparatus comprising:
the optical scanning apparatus according to claim 10; and
a printer controller that converts code data input from an external device into an image signal and inputs the image signal into the optical scanning apparatus.

15. A color image forming apparatus comprising:
a plurality of the optical scanning apparatuses according to claim 10; and
a plurality of image carriers that are disposed on the surfaces to be scanned by the optical scanning apparatuses and form images in different colors.

16. The color image forming apparatus according to claim 15, further comprising a printer controller that converts a color signal input from an external device into image data in different colors and inputs the image data into the optical scanning apparatuses.

* * * * *